United States Patent [19]
Schulz

[11] Patent Number: 5,601,174
[45] Date of Patent: Feb. 11, 1997

[54] CLUTCH PLATE AND METHOD FOR ITS MANUFACTURE

[75] Inventor: Norbert Schulz, Marienheide, Germany

[73] Assignee: Raybestos Industrie-Produkte GmbH, Morbach, Germany

[21] Appl. No.: 418,653

[22] Filed: Apr. 10, 1995

[30] Foreign Application Priority Data

Apr. 21, 1994 [DE] Germany ............................ 44 14 058.4

[51] Int. Cl.⁶ .............................. F16D 69/04; F16D 13/64
[52] U.S. Cl. ................................ 192/107 M; 29/402.01; 156/98; 188/73.32; 188/250 G; 192/107 R
[58] Field of Search .......................... 192/107 M, 107 R, 192/107 C; 156/94, 98; 29/402.01, 402.06, 402.18; 188/250 G, 73.1, 73.32

[56] References Cited

U.S. PATENT DOCUMENTS

| | | | |
|---|---|---|---|
| 2,178,527 | 10/1939 | Wellman | 192/107 R X |
| 2,277,107 | 3/1942 | Imes | 192/107 R |
| 2,728,701 | 12/1955 | Wirth | 192/107 M |
| 2,784,824 | 3/1957 | Hanslip | 192/107 R |
| 2,973,842 | 3/1961 | Smiley | 192/107 M X |
| 3,761,231 | 9/1973 | Dowell et al. | 192/107 M X |
| 4,903,814 | 2/1990 | Tomotake et al. | 192/107 C |
| 5,199,540 | 4/1993 | Fitzpatrick-Ellis et al. | 192/107 M X |

*Primary Examiner*—Rodney H. Bonck
*Attorney, Agent, or Firm*—Merchant & Gould, Smith, Edell, Welter & Schmidt

[57] ABSTRACT

A clutch plate comprises a plate body having a hub and a driven plate which is connected to the plate body through compression springs to rotate with it and extends radially beyond the plate body. A ring-shaped friction lining is secured on the driven plate by rivets, the head of which are sunk into the friction lining. The friction lining is made up of two layers of friction material, and underneath layer riveted to the driven plate and an upper layer stuck onto the lower layer of friction material to cover its whole surface.

9 Claims, 1 Drawing Sheet

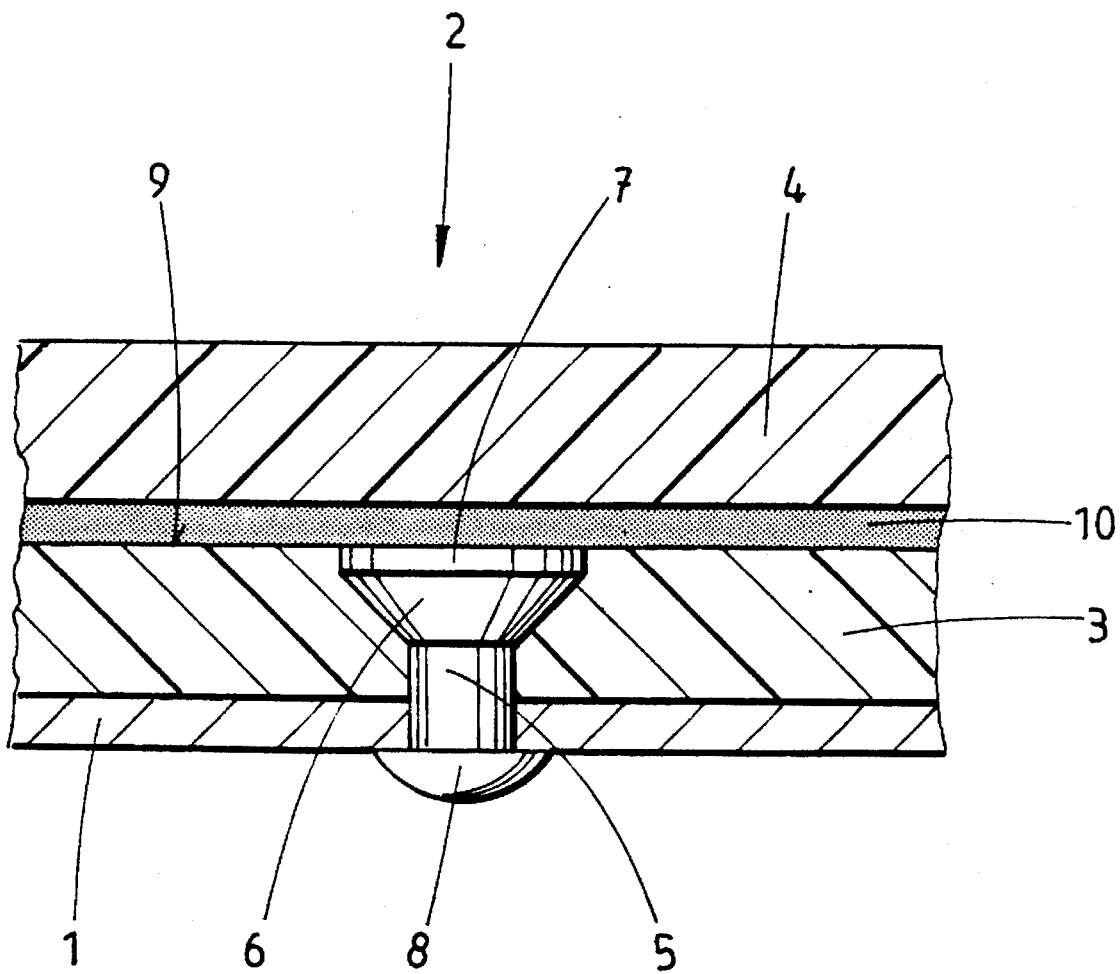

CLUTCH PLATE AND METHOD FOR ITS MANUFACTURE

The invention relates to a clutch plate of the kind having a rotatable plate body including a hub, a driven plate connected to the plate body by compression springs so that the driven plate is rotatable with the plate body, the driven plate extending radially outwards of the plate body, and at least one annular friction lining arranged radially outside the plate body and secured on one side to the driven plate by rivets, the rivets having heads received in recesses in the friction lining; and to a method of manufacturing such clutch plates.

When reference is made to clutch plates, it is to be understood in the widest sense, that is to say plates which are used for making a friction connection between a driving motor and a driven shaft, such as for example in motor vehicles or similar drives where such clutch plates serve in change-speed gearboxes. However further possible uses are not excluded.

Clutch plates of the kind set forth have the problem that the friction linings provided on one or both faces of the driven plate must have a bursting strength, that is, sufficient strength to handle the high frictional and centrifugal forces which arise on faulty gear-changing, where for example during driving at a high speed a change is made in error from a higher ratio to a lower ratio. In this situation the friction lining must have sufficient strength to prevent it from bursting and breaking up.

In order to achieve the necessary bursting strength it is known to provide clutch plates with reinforced friction linings, that is, friction linings which not only have the desired frictional characteristics but also prevent the friction lining secured to the driven plate from bursting under situations of extreme load and thereby becoming free from the driven plate. Reinforced friction linings are friction linings which in addition to the actual friction material contain also reinforcing materials such as for example strand-like or thread-like inserts which are distributed in the material of the friction lining in an appropriate manner and can be made materials or fine metal wires.

It has been found that friction linings for clutch plates under inappropriate treatment and high centrifugal force tend to burst in the region which is secured by means of rivets to the driven plate, that is, in the region adjacent to the driven plate. It has also been found that the region of the friction linings outside the array of rivets need not be reinforced, since even at high overloads no adverse consequences arise if these regions have no reinforcement.

The invention is based on solving the problem of being able to manufacture in a simple manner clutch plates of optimum wear strength.

According to a first aspect of the invention, in a clutch plate of the kind set forth each friction lining comprises underneath and upper layers of friction material, the underneath layer being riveted to the driven plate and the upper layer being stuck onto an outer surface of the underneath layer in the face to face contact therewith.

Making each friction lining in two layers achieves the different characteristics which are necessary for clutch plates and their friction linings, by different zones or portions of the friction linings.

Thus the underneath part of each friction lining preferably reinforced and accordingly designed to handle the bursting forces, whilst the upper part of the friction lining is not reinforced in order preferably to achieve the desired friction characteristics. This upper part of friction lining according to the invention forms the wearing layer, whereas the underneath portion has substantially a supporting or holding function.

The underneath layer of friction material is preferably machined or ground to the required thickness, before applying the upper layer. The underneath layer, as it remains on the friction plate, has an extremely stable shape after machining and forms a very good substrate for the upper layer of friction material or replaceable wear layer of the friction lining.

According to a second aspect of the invention, a method of manufacturing a clutch plate of the kind set forth comprises machining the second side of each friction lining attached to the driven plate down to about the level of the rivet heads, grinding the second side flat, applying adhesive to the flat ground second side, and sticking a further annular friction lining of corresponding area to the friction lining.

The adhesive may be a thermosetting adhesive, the further friction lining being stuck on using the effect of heat and pressure. The first friction lining may be a partially worn reinforced friction lining.

A particular advantage of the invention lies in the fact that existing clutch plates of which the friction linings are already worn can be used again without the necessity for anti-pollution methods of disposal because the invention makes it possible to provide the worn annular friction linings of existing clutches with a new friction surface which can be without reinforcement. Re-using clutch plates having worn friction linings by the application of a new friction layer is more economical than the replacement of the entire reinforced friction lining or indeed the replacement of the clutch plate together with the associated disposal problems.

The two-layer construction of the friction lining also has the advantage that the different characteristics required of a friction lining can be concentrated in those regions where they are really necessary. A further advantage lies in the fact that the surface of the two-layer friction lining can be uninterrupted that is to say it is not interrupted by holes provided for the rivets which form attachment elements. The friction area available is therefore greater than in comparable known friction linings.

The invention is further explained in conjunction with the drawing, the single FIGURE of which shows larger than life and not to scale a partial section through a portion of a clutch plate, not further illustrated, provided with a friction lining on one face.

The figure shows a friction lining 2 secured on one face of a driven plate 1 of a clutch plate, not further illustrated, of known construction. This friction lining 2 is made in two layers and comprises an underneath layer 3 of friction material engaging the driven plate 1 and secured on it, and a second or upper layer 4 of friction material secured on the underneath layer 3.

Rivets 5 are provided for attaching the underneath layer 3 for the driven plate 1, and each rivet 5 has a conical head 6 arranged in a countersunk or recessed hole 7 in the underneath layer 3 of friction material. The opposing end 8 of each rivet 5 is spread or squeezed on the opposite side of the plate 1 in order to provide a riveted connection in the usual manner.

The underneath layer 3 of friction material is made of reinforced friction material. There is applied to the outer face 9 of the underneath layer 3 a thin adhesive coating 10 of thermosetting adhesive, shown in the drawing of greater thickness than in reality, simply in the interests of better illustration. By means of this adhesive layer 10 the upper layer 4 of friction material is secured to the underneath layer 3 after the adhesive has set so that both layers 3,4 of friction material of the lining 2 virtually form a single body.

The upper layer 4 of friction material is the wearing layer of the friction lining 2 and can be made of non-reinforced material.

When the upper layer 4 of friction material is worn away by wear of the friction lining 2, then after grinding of the underneath layer 3 a new layer of friction material can be stuck on it so that the clutch plate can always be used again and accordingly does not have to be disposed of.

What is claimed is:

1. A rotatable clutch plate comprising:

a driven plate having opposite facing first and second major surfaces, and at least one rivet hole extending from the first major surface to the second major surface;

an annular friction lining positioned over said first major surface of said driven plate, said friction lining having opposite facing first and second sides, wherein said friction lining includes first and second layers of friction material, said first layer having a recess sized for a head of a rivet; and a rivet positioned in said rivet hole of said driven plate and securing said first side of said friction lining to said driven plate, said rivet having a head received in said recess in said first layer of said friction lining, said first layer of said friction lining being secured to said first major surface of said driven plate by said rivet, and said second layer of said friction lining being adhered to said first layer in face to face contact therewith, wherein said first layer of said friction lining is positioned between said second layer of said friction lining and said driven plate, and wherein said second layer of said friction lining covers said rivet.

2. A clutch plate according to claim 1 wherein said first layer of friction material is made of reinforced friction material.

3. A clutch plate according to claim 1 wherein said second layer of friction material is made of non-reinforced friction material.

4. A clutch plate according to claim 1 wherein an exposed surface of said first layer of friction material facing in an opposite direction to said driven plate is ground smooth to the required thickness of said first layer before application of said second layer of friction material.

5. A clutch plate according to claim 1 wherein said first layer of friction material is a surface-worn and already-used reinforced friction lining.

6. A method of manufacturing a clutch plate having a rotatable plate body including a hub, a driven plate connected to said plate body by compression springs whereby said driven plate is rotatable with said plate body, said driven plate extending radially outwards of said plate body, and at least one annular friction lining, said friction lining being arranged radially outside said plate body and having opposed first and second sides, said first side being secured to said driven plate by rivets, each of said rivets having a head received in a recess in said friction lining, wherein said method comprises the steps of:

providing a clutch plate with at least one partially-worn friction lining;

machining said second side of said partially-worn friction lining attached to said driven plate down to about the level of said heads of said rivets;

grinding said second side flat;

applying adhesive to said flat ground second side; and adhering a further annular friction lining of corresponding area to said partially-worn friction lining.

7. A method according to claim 6 wherein said step of applying adhesive includes the step of applying a thermosetting adhesive, and wherein said step of adhering said further annular friction lining includes the step of using heat and pressure applied to an interface region between said further annular friction lining and said partially-worn friction lining.

8. A method according to claim 6 wherein said step of providing said partially-worn friction lining includes providing a partially-worn reinforced friction lining.

9. A method according to claim 6 wherein said step of adhering a further annular friction lining includes the step of covering said rivets joining said partially-worn friction lining to said driven plate with said further annular friction lining.

* * * * *